July 4, 1961

C. A. COOK 2,990,850

PRESSURE REGULATOR MECHANISM

Filed Sept. 27, 1956

INVENTOR.
CHARLES A. COOK
BY
ATTY.

United States Patent Office 2,990,850
Patented July 4, 1961

2,990,850
PRESSURE REGULATOR MECHANISM
Charles A. Cook, Jackson, Mich., assignor to Clark
Equipment Company, a corporation of Michigan
Filed Sept. 27, 1956, Ser. No. 612,541
2 Claims. (Cl. 137—540)

This invention relates to mechanisms for fluid pressure regulators, and more particularly to mechanisms for producing a sudden drop in the pressure maintained by the regulator.

It is frequently desirable to be able to make sudden changes in the pressure maintained by a fluid pressure regulator. An example of an application in which this is desirable is in the hydraulic system of an automotive vehicle transmission which utilizes fluid pressure for energizing brakes and clutches therein to change the gear ratio and to change between forward and reverse. In such a transmission it is ordinarily necessary to have a relatively high fluid pressure when the transmission is providing considerable gear reduction and the vehicle is loaded, because under these conditions the torques which the clutches and brakes must withstand are relatively high. However, when the gear reductions are smaller and the load is lighter it is desirable to utilize a smaller fluid pressure in order to "soften" the shift between ratios. If the same pressure is employed under the latter conditions as under the first mentioned conditions the result is that the clutches or brakes engage too suddenly and produce a jerk when a shift occurs.

It is the object of my invention to provide a pressure regulator mechanism which may be employed readily to achieve a sudden reduction in the regulated pressure whenever desired.

In carrying out my invention in one form I provide a regulator comprising by-pass valve means which is biased by a spring. The regulated pressure fluid is admitted to a chamber in which is located a movable support for the spring. Provision is made for quickly moving the fluid in the chamber and the spring support when it is desired to establish a lower pressure.

Figure 1:
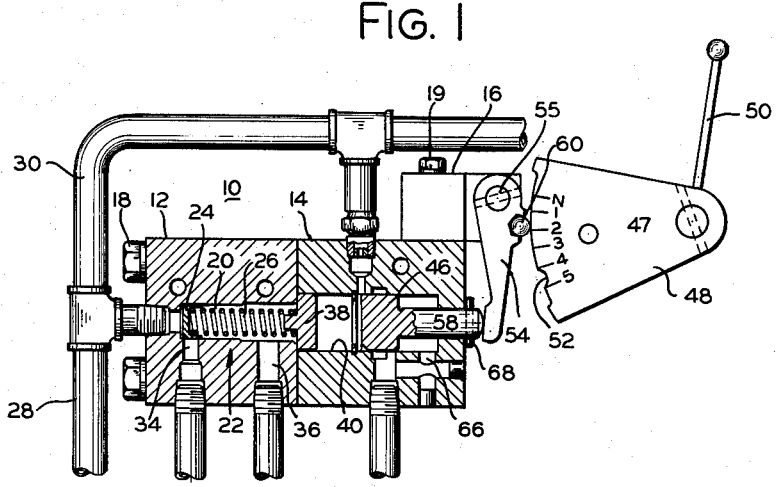
Figure 2:
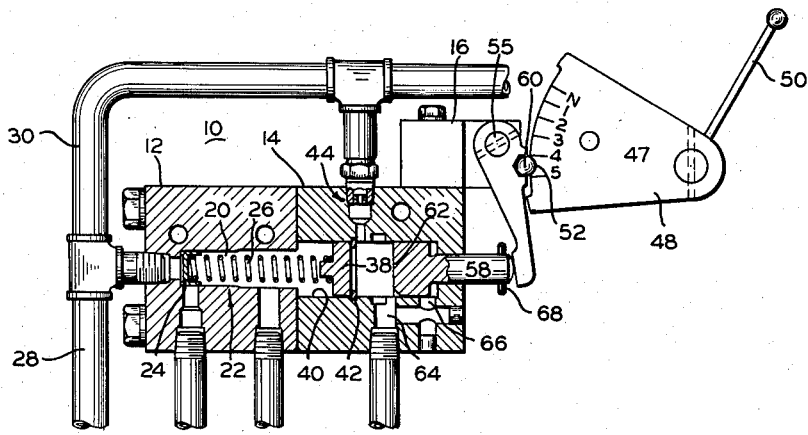

For a clearer and more complete understanding of my invention reference should be had to the accompanying drawing in which FIG. 1 is a view which is partially schematic and partially in section of a pressure regulator mechanism embodying my invention, while FIG. 2 is the view similar to FIG. 1 showing the mechanism in a different operative position.

Referring to the drawings, I have shown a pressure regulator mechanism indicated generally by the numeral 10 having a housing or casing portion which may conveniently be made up of three metal parts 12, 14 and 16 secured together in any suitable manner such as by screws 18 and 19. In portion 12 of the casing is located a valve chamber 20 which contains a biased pressure regulating valve mechanism which I have indicated generally by the numeral 22. The mechanism 22 includes a valve body 24 which is urged toward the left end of chamber 20 by means of a helical biasing spring 26.

Fluid is supplied under pressure from a pump or other source not shown through a conduit connection 28. The valve mechanism 22 maintains a predetermined pressure in a conduit 30 by allowing a variable amount of fluid to pass valve body 24 and be returned to the sump or other location through an opening 34 in casing portion 12, which opening connects with valve chamber 20. It will be understood by those familiar with devices of this type that biasing spring 26 has characteristics such that it maintains a predetermined pressure in the conduit 30 and that if pressure in the conduit tends to rise the spring is compressed to allow the exhaust of additional fluid through opening 34, while if the pressure in the conduit tends to fall the spring will extend to reduce the amount of fluid by-passed to the sump. In this manner valve mechanism 22 regulates the pressure in the conduit 30, at a predetermined value lower than the pressure of the fluid received in the connection 28. The conduit 30 may supply fluid under pressure for the operation of an automotive transmission or other mechanism (not shown).

The right end of spring 26 is supported by a piston member 38 which is reciprocably located in a chamber 40 in casing portion 14. Normally piston 38 remains at the left end of chamber 40 as illustrated in FIG. 1; however, under certain conditions as described hereinafter, the piston portion 38 moves to the right to the position shown in FIG. 2 in which it is restrained from further movement to the right by means of a snap ring 42 or other suitable stop means in the chamber 40.

Chamber 40 is connected to conduit 30 by means of a flow restricting orifice 44. With this arrangement, when operation of the pressure regulator mechanism is initiated, chamber 40 fills with fluid from conduit 30 after an interval which may, for example, be a few seconds. Thereafter, the pressure in chamber 40 maintains piston 38 against the left end of chamber 40 as illustrated in FIG. 1, until the pressure in chamber 40 is relieved as described later. Piston 38 remains at the left end of chamber 40 because the cross sectional area of the right end of the piston is greater than the cross sectional area of valve chamber 20 so that the pressure tending to push piston 38 to the left is greater than that exerted by the pressure at the left end of valve body 24 acting through spring 26 tending to push piston 38 to the right. A drain passage 36 is provided from valve chamber 20 through casing 12 to allow any fluid which gets into valve chamber 20 between valve body 24 and piston 38 to drain out of the valve chamber and not build up pressure in this portion of the valve chamber.

A second piston 46 is located in chamber 40 and is arranged to be moved from an extreme left position illustrated in FIG. 1 to an extreme right position illustrated in FIG. 2. Such movement of piston 46 allows piston 38 and the fluid located between the two pistons to move quickly to the right and thus quickly reduce the bias of spring 26. This reduction in the force exerted by the spring causes the valve mechanism suddenly to reduce the pressure maintained in conduit 30 to a lower regulated valve dependent upon the characteristic of the spring.

Piston 46 may be moved in this manner by any suitable mechanism when it is desired to reduce the regulated pressure. I have shown herein a typical control mechanism for an automotive transmission, providing means for reducing the regulated pressure in one position of a transmission ratio selector 47.

The selector illustrated comprises a sector portion 48 having indicia thereon which in this instance indicate one neutral and five ratio positions ranging from 1 to 5. An operating lever 50 is secured to sector portion 48 for shifting the sector portion between its various positions. In the transmission for which this particular ratio selector was designed the fifth ratio is the ratio providing the smallest gear reduction, this being commonly known as the high speed position. In this transmission it was desired to reduce the fluid line pressure in the transmission from approximately 100# per sq. in. which was in effect for all other conditions to approximately 40# per sq. in. at the time the shift is made from the fourth to the fifth position or vice versa.

To accomplish this I have provided a depression 52 in sector 48 between the fourth and fifth positions. A lever 54 which is pivotally mounted at 55 on portion 16 of the housing is arranged to engage a rod 58 extending from piston 46. A ball detent 60 carried by the lever engages the outer surface of sector 48, and as illustrated in FIG. 2 when the selector is moved between the fourth and fifth ratio positions the ball detent drops into the depression 52 in the sector portion 48.

When the ball detent drops into the depression in this manner, the lever 54 is forced quickly to the right by the force of spring 26 which pushes piston 38, piston 46 and the intervening fluid between them quickly to the right until piston 38 reaches stop 42 and piston 46 is stopped by the lever 54 when ball 60 reaches the bottom of depression 52. As soon as the left face 62 of piston 46 has passed the leading edge of an opening 64 in casing 14 the trapped fluid drains from chamber 40 through opening 64. The fluid drains from between the two pistons more rapidly than it is admitted by orifice 44, which assures that piston 38 will move all the way to the right with no interference by the trapped fluid.

In the particular application being described it was desired to have a momentary reduction pressure only; therefore, the sector 48 is arranged so that as the transition is completed from position 4 to position 5 the ball detent is forced out of groove 52 again, pushing the lever 54 to the left and returning piston rod 58 and piston 46 to the left also to restore the previous condition in the pressure regulating mechanism. As soon as piston 46 again covers opening 64 the space between pistons 38 and 46 is filled by fluid entering through orifice 44. As this space is filled piston 38 is forced to the left again to its normal position and thereafter the regulating mechanism maintains the higher pressure. This operation of filling the space between the two pistons to restore piston 38 to its previous position requires a few seconds, the actual time depending upon the size of metering orifice 44, but this is ample to allow the completion of the shift between fourth and fifth ratios at the lower fluid line pressure. Thereafter the fluid line pressure is maintained at the higher value for holding the clutches or brakes in the transmission engaged and maintaining readiness for another shift. A drain opening 66 is provided through casing 14 to allow any fluid which may collect behind piston 46 to drain out. Means such as a pin 68 extending through piston rod 58 may be provided to establish a limit to the leftward movement of piston 46.

While my improved mechanism has been described and illustrated herein in a preferred form in compliance with the patent statutes it will be understood that my invention is not limited to this form. For example, it will be apparent to those familiar with mechanisms of this type that other means than the lever and sector selector means described and illustrated herein may be employed for selectively allowing pistons 38 and 46 to move to the right to achieve a sudden reduction in the predetermined regulated pressure in conduit 30. Also, it will be apparent that this invention is not limited to a mechanism which provides a momentary pressure change as described and illustrated herein but may be used with equal facility in many places where it is desired to achieve a sudden change in a regulated fluid pressure and then maintain the changed pressure for an extended period.

It should be understood, therefore, that I intend to cover by the appended claims all modifications which fall within the true spirit and scope of my invention.

I claim:

1. A fluid pressure regulator mechanism comprising, connections to a source of fluid under pressure, a conduit for receiving fluid from the source at a regulated pressure, valve means for by-passing a portion of the fluid received from the source in order to maintain the said regulated pressure in the said conduit, the said valve means including a valve body and a spring exerting a force thereagainst, a chamber including a cylindrical wall, fluid connections between the said conduit and the said chamber including an orifice of relatively small diameter so that fluid flow from the conduit into the chamber is restricted, a piston member at one end of the said chamber arranged to serve as a movable support for the said spring, a second piston member in the chamber arranged normally to trap fluid in the chamber between the second piston and the said first piston, means for allowing movement of the said second piston away from the said first piston whereby the first piston and the fluid trapped between the two pistons are allowed to move and thereby reduce the force exerted by the said spring in order to reduce the pressure maintained in the said conduit, and an opening in the said cylindrical wall of the said chamber arranged to be uncovered by movement of the said second piston away from the said first piston in order to allow fluid between the two pistons to drain from the chamber and remove the effective fluid pressure on said first piston.

2. A fluid pressure regulator comprising, connections to a source of fluid under pressure, a conduit for receiving fluid at either of two selectable regulated pressures lower than the initial pressure, valve means for by-passing a portion of the fluid received from the source in order to maintain the selected regulated pressure in the said conduit, the said valve means including a valve body and a spring exerting a force thereagainst, a chamber, a first movable piston member located in the said chamber and arranged to serve as a movable support for the said spring, a second movable piston member located in the said chamber in coaxial spaced relation with said first piston member, fluid connections for admitting a restricted flow of fluid at the selected regulated pressure into the chamber between the two said piston members, the said piston members in the chamber being arranged so that in a first operative position fluid is trapped between the two pistons, the said first piston member in its said first operative position holding the said spring in a position to produce the first said regulated pressure, an opening in the walls of said chamber of sufficient size to drain fluid from the chamber at a faster rate than it is admitted through the said restricted flow connections to remove the effective fluid pressure on said first piston, selective means for holding the said second piston in a position in the said chamber to provide the said first operative position and for releasing the second piston allowing it to move away from the said first piston whereby the first piston and the fluid trapped between the said two pistons are allowed to move and thereby reduce the force exerted by the said spring in order to maintain the second lower regulated pressure in the said conduit, the opening in the wall of the said chamber arranged to be uncovered by movement of the said second piston away from the said first piston, and stop means in the chamber for limiting the movement of the said first piston toward the said second piston.

References Cited in the file of this patent

UNITED STATES PATENTS

| | | |
|---|---|---|
| 1,025,341 | Turner | May 7, 1912 |
| 1,157,870 | Houser | Oct. 26, 1915 |
| 1,251,962 | Caraballo | Jan. 1, 1918 |
| 2,064,343 | Finley | Dec. 15, 1936 |
| 2,317,745 | Duckstein | Apr. 27, 1943 |
| 2,434,799 | Higgens | Jan. 20, 1948 |
| 2,649,688 | Slomer | Apr. 25, 1953 |
| 2,741,263 | Spencer | Apr. 10, 1956 |
| 2,788,800 | Towler | Apr. 16, 1957 |
| 2,815,921 | Bigelow | Dec. 10, 1957 |
| 2,890,715 | Ebersold | June 16, 1959 |